United States Patent [19]

Liebig

[11] Patent Number: 4,690,597

[45] Date of Patent: Sep. 1, 1987

[54] POSITIVE ARRANGEMENT FOR FASTENING A DOWEL

[76] Inventor: Heinrich Liebig, Wormser Strasse 23, D-6102 Pfungstadt, Fed. Rep. of Germany

[21] Appl. No.: 638,970

[22] PCT Filed: Jan. 20, 1984

[86] PCT No.: PCT/EP84/00017

§ 371 Date: Aug. 6, 1984

§ 102(e) Date: Aug. 6, 1984

[87] PCT Pub. No.: WO84/03917

PCT Pub. Date: Oct. 11, 1984

[30] Foreign Application Priority Data

Apr. 2, 1983 [DE] Fed. Rep. of Germany ....... 3312141

[51] Int. Cl.$^4$ ............................................. F16B 13/04
[52] U.S. Cl. ........................................ 411/32; 411/54; 411/57
[58] Field of Search ........................ 411/32, 54, 44, 55, 411/57, 60; 81/121.1, 124.3, 124.7, 177.85

[56] References Cited

U.S. PATENT DOCUMENTS

| 784,845 | 3/1905 | Evans | 411/54 |
|---|---|---|---|
| 2,385,126 | 9/1945 | Benton | 411/54 |
| 2,403,330 | 7/1946 | Benton | 411/54 |
| 3,364,808 | 1/1968 | Fischer | 411/60 X |
| 3,872,527 | 3/1975 | Tregoning | 81/121.1 |
| 4,011,786 | 3/1977 | Liebig | 411/57 |
| 4,084,454 | 4/1978 | Day | 81/124.7 |
| 4,122,753 | 10/1978 | Kuhlmann | 411/2 |
| 4,293,259 | 10/1981 | Liebig | 411/32 |
| 4,330,230 | 5/1986 | Giannuzzi | 411/57 X |
| 4,408,937 | 10/1983 | Hainke et al. | 411/57 X |
| 4,416,048 | 11/1983 | Otte | 411/32 X |

FOREIGN PATENT DOCUMENTS

| 2112591 | 5/1982 | Fed. Rep. of Germany | 411/57 |
|---|---|---|---|
| 494089 | 5/1919 | France | 411/55 |
| 999794 | 10/1951 | France | 411/55 |
| 1222787 | 1/1960 | France | 411/60 |
| 725291 | 3/1955 | United Kingdom | 411/57 |
| 2094919 | 9/1982 | United Kingdom | 411/57 |

Primary Examiner—Gary L. Smith
Assistant Examiner—Neill Wilson

[57] ABSTRACT

The dowel (14) comprises an elongated fastening bolt (26) provided at its rear end, at the outer end of the hole, with a threaded nut or bolt head (30), a head part (34) being arranged at its front end, at the inner end of the hole, upon which are mounted, by means of a conically tapering component (38) arranged displaceably upon the said fastening bolt, locking elements (36) adapted to pivot radially outwardly into a position engaging in the undercut. Displacement of the said conically tapering component is effected by a distance sleeve (42) arranged upon the said fastening bolt (26) and adjoining the said conically tapering element. The head part (34) and the anchoring elements (36) are in the form of an integral, substantially sleeve like anchoring component (28) carrying a wedge shaped peripheral groove (32) in its outer surface, the said locking elements consisting of segmental sections produced by a series of slots recessed at uniform angular distances from the front edge as far as the said peripheral groove (FIG. 1c.).

4 Claims, 11 Drawing Figures

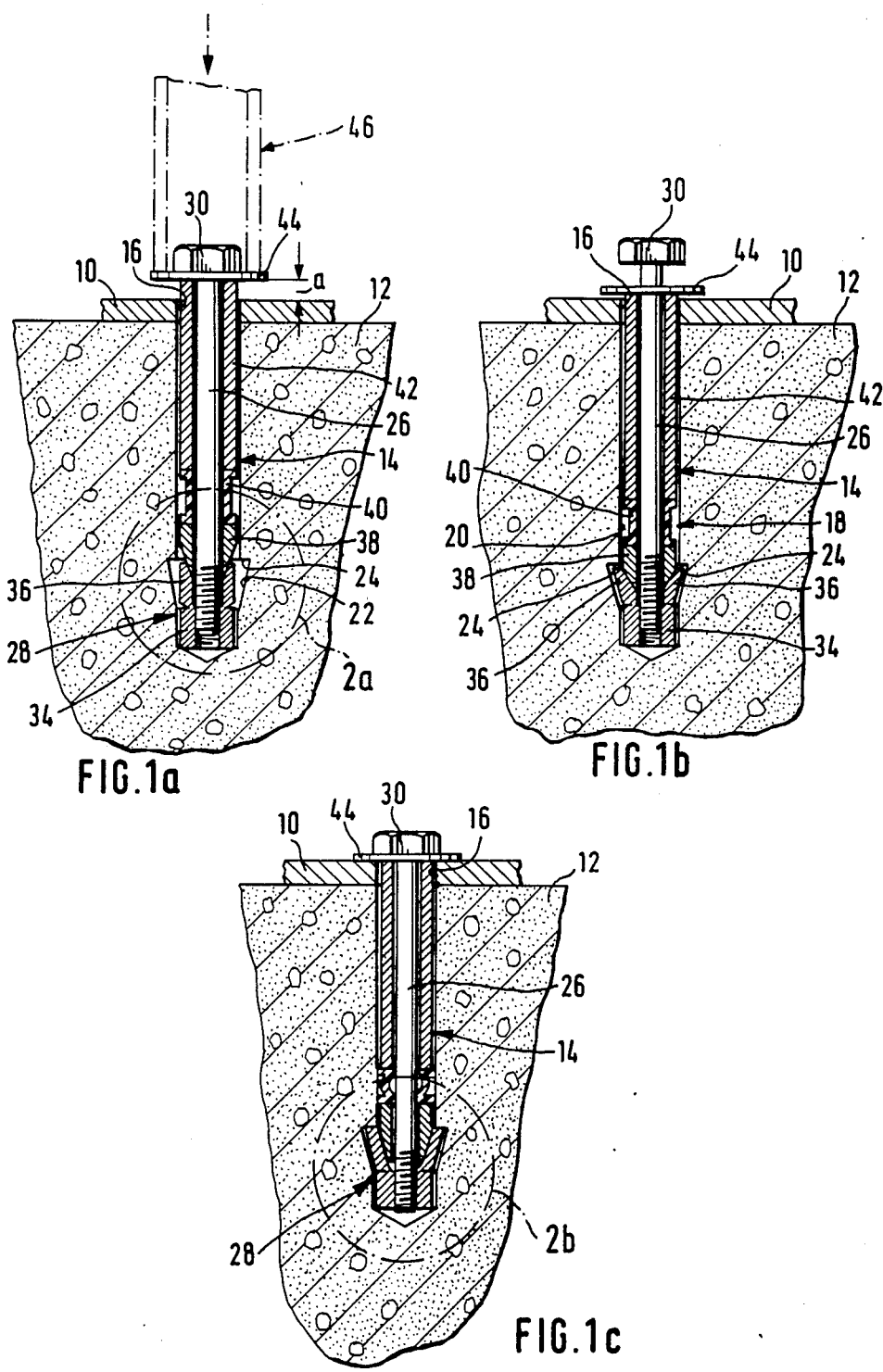

POSITIVE ARRANGEMENT FOR FASTENING A DOWEL

The invention relates to a positive fastening arrangement for a dowel in a hole in a sub-surface, in which the said hole, in the form of a blind, cylindrical bore, is provided at a distance from its mouth, in the sub-surface, with an expansion comprising an undercut surface extending radially and rearwardly towards the mouth of the hole, the said dowel comprising a head part of approximately the same diameter as the hole, arranged at the end of an elongated fastening bolt and adapted to be introduced into the hole, the ends of the locking elements, at the inner end of the hole, being mounted pivotably upon the said head part, the rearwardly projecting ends of the said locking elements being adapted to pivot from a position within the diameter of the hole to a position in which they project at least partly out of the diameter of the said head part and in which they engage lockingly in the said undercut surface in the hole, the said fastening bolt comprising, at its outer end, a bolt head, or a nut screwed to a thread on the said fastening bolt, a component, tapering conically towards the interior of the hole and engaging between the ends of the said locking elements, pointing towards the mouth of the hole in such a manner that when the head part is displaced towards the mouth of the hole, the ends of the locking elements, pointing towards the mouth of the hole, are pivoted positively and radially outwardly.

The Applicant has developed dowels of the above mentioned type (German No. OS 27 58 091; German No. OS 29 06 914) for fastening arrangements of this kind which were also of great interest for purposes for which known and proven expanding dowels could not be used for reasons of safety. One major advantage of the newly developed dowels is that they provide positive anchorage without expansion pressure. However, as compared with expanding dowels, positive setting dowels are of complex design which makes them more costly to produce and limits their use accordingly. Moreover, the production of an undercut surface in the preliminary bore requires additional labour.

In contrast to this, it is the purpose of the invention to simplify the design of known positive setting, expansion pressure free dowels, without impairing the function thereof, thus making it possible to produce them at a lower price and with smaller dimensions than heretofore.

Base upon a fastening arrangement of the type mentioned at the beginning hereof, this purpose is achieved, according to the invention, in that the head part and the locking elements are integral parts of a sleeve like anchoring component carrying a wedge shaped peripheral groove in its outer surface, the wall of said anchoring component being divided into a number of segmental sections by a series of slots recessed from the front edge, at uniform angular spacing, in parallel with the centre line, as far as the said peripheral groove, the said segmental sections constituting the said locking elements, while the remaining unslotted part of the said anchoring component forms the said head part. The one piece anchoring component may be produced quite simply, from the production point of view, on automatic cutting machine tools, being turned from the raw material. This eliminates the assembly of separately produced locking elements to the head part, as required in the case of known dowels.

According to one advantageous development of the invention, it is desirable for the length of the dowel, as measured from the end face, in the interior of the hole, of the head part to the end face, at the mouth of the hole, of the distance sleeve, to be approximately equal, when the locking elements are pivoted inwardly, to the depth of the preliminary bore plus the thickness of the workpiece to be fastened, and of the dimension of the travel provided to allow the locking elements to pivot into the locking position. The setting of the dowel is then a simple matter, in that it is inserted, through the hole in the workpiece to be fastened, into the hole, until the inner end of the dowel is seated upon the bottom of the said hole. The end of the distance sleeve facing towards the mouth the hole then projects, by at least the amount required to allow the locking elements to pivot outwardly into the locking position, beyond the surface of the workpiece to be fastened. Setting the dowel merely requires a sharp blow on the end face, facing towards the mouth of the hole, of the distance sleeve, or on the washer usually provided between the said distance sleeve and the head of the fastening bolt or nut, in order to drive the conically tapering component between the segmental sections forming the locking elements, to pivot the latter into the locking position. Further simplification is achieved since this eliminates the provision of special means for preventing the dowel from rotating during setting, or of springs held under preload and released during setting, such as are needed in known dowels.

In one practical development of the invention, arranged between the conically tapering component and the distance sleeve is a sleeve component which is deformed in the axial direction, under the action of compressive stresses, in such a manner as to become shorter, the resistance of the said sleeve component to becoming axially shorter being greater than the resistance of the locking elements to pivoting outwardly into the locked position at the undercut surface. This ensures that the setting operation can again be carried out rapidly and simply by means of a blow, whereas the sleeve component, made of a suitable synthetic material, for example, makes it possible for the workpiece to be tightened to the sub-surface even if the depth of the hole therein cannot be kept 100% accurate, i.e. if it is a little short or if the travel of the distance sleeve required to allow the locking elements to pivot outwardly into the locking position is shortened as the result of a somewhat reduced radial diameter of the expansion bore. In other words, in spite of the fact that the depth of the hole must be adapted to the size of the dowel, certain discrepancies in the dimensions of the hole do not impair the functioning of the simplified dowel.

For the purpose of setting the dowel according to the invention, in which, as already mentioned, a washer is arranged between the end face, facing the mouth of the hole, of the distance sleeve, and the underside of the head of the fastening bolt, or of the nut screwed thereto, use is made of a suitable tool comprising a hollow front end adapted to be placed loosely over the head of the fastening bolt, or of the nut, onto the projecting edge of the washer, the rear end of the said tool, remote from the front end, being provided with a striking surface, the cavity, formed at the front end for the head of the fastening bolt, or the nut, having an axial length which is at least equal to the thickness of the said bolt head or nut, plus the travel required to allow the locking elements to pivot outwardly into the position in engagement with the undercut surface. In the simplest case, a tool of this kind may be made of a suitable length of tube, the inside diameter of which is slightly larger than the maximal width of the bolt head or the nut.

In addition to its use in transferring the blow required to set the dowel, the tool may be further developed for use in securing workpieces to the sub-surface by rotating the bolt head or the nut. To this end, the cavity at the front end of the tool is shaped to match the form of the head of the fastening bolt or nut, and provision is also made to fit or secure a lever arm to the said tool.

The invention is explained hereinafter in greater detail, in conjunction with the example of embodiment illustrated in the drawing attached hereto, wherein:

FIGS. 1a, 1b and 1c are cross-sections through a fastening arrangement produced by using a positive setting dowel adapted to be placed in a hole provided with an undercut surface, showing various stages of the setting operation;

FIGS. 2a and 2b each show an enlarged partial cross-section of the area of the fastening arrangement within dotted circles 2a and 2b in FIGS. 1a and 1c;

Figure 2A:
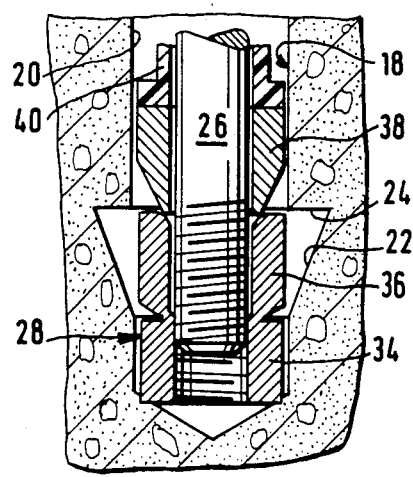

FIGS. 1a, 1b and 1c illustrate an arrangement for fastening a workpiece 10 to a sub-surface 12, for example a concrete floor. This is effected by means of a positive setting dowel 14 which is inserted, during assembly, through attachment hole 16 in workpiece 10, into a hole 18 in sub-surface 12, the said hole consisting of a preliminary hole 20 and an expansion hole 22, located at a distance from the mouth of the hole and comprising a radially peripheral undercut surface 24 facing rearwardly towards the mouth of the hole.

Dowel 14 comprises an elongated fastening bolt 26. Screwed to the threaded part thereof, within the hole, is a sleeve like anchoring component 28, the diameter of which is only slightly smaller than that of preliminary bore 20. The said fastening bolt is adpated to be screwed into and out of the anchoring components by rotation, to which end a bolt head 30 is arranged on the end of the fastening bolt located at the outer end of the hole.

Integral head 30, formed on the fastening bolt, may be replaced by a nut screwed to the end thereof located at the outer end of the hole.

Figure 2B:
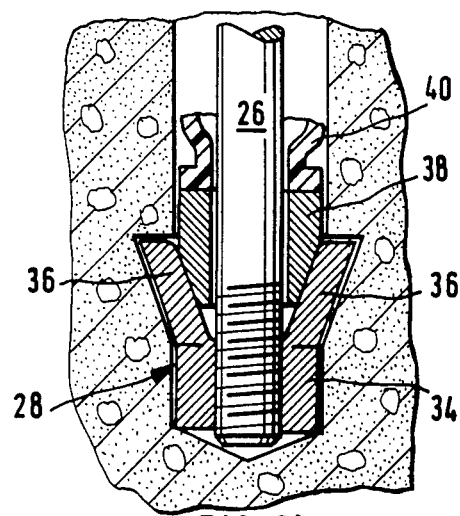
Figure 3:
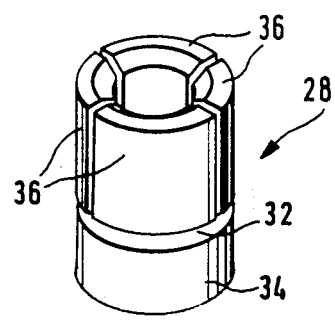
FIG. 3 is a perspective view of the anchoring component of the positive setting dowel used.
Figure 4:
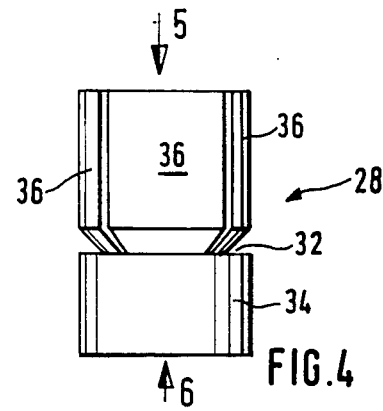
FIG. 4 is a side elevation of the anchoring component illustrated in FIG. 3.
Figure 5:
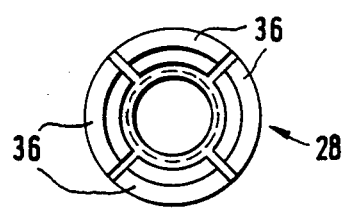
FIG. 5 is a view in the direction of arrow 5 in FIG. 4.
Figure 6:
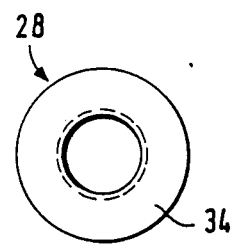
FIG. 6 is a view in the direction of arrow 6 in FIG. 4.

As may be gathered more particularly from FIGS. 2a and 4, anchoring component 28 is divided into two axially consecutive sleeve sections by a cross-sectionally wedge-shaped peripheral groove cut into the outer surface of the said component, the said sections being held together in one piece by the material remaining between the base of the said peripheral groove and the interior of the said anchoring component. The lower sleeve section, within the bore, forms a head part 34 which carries a thread matching the threaded section on fastening bolt 26 at the inner end of the bore. The upper, unthreaded sleeve section is divided into four cross-sectionally segmental locking elements 36 by slots milled from the front edge facing the mouth of the hole and running, at uniform angular distances, as far as peripheral groove 32, the said locking elements, by deformation of the material connecting them to head part 34, being adapted to be expanded and pivoted outwardly from the end face facing the end of the hole, whereupon wedge-shaped peripheral groove 32 closes, i.e. the opposing wedge surfaces on head part 34 and on locking surfaces 36 come to rest one upon the other, as shown in FIG. 2b.

A component 38, tapering conically towards the interior of the hole and engaging, with its tapered ends, between locking elements 36, is arranged to move longitudinally upon fastening bolt 26 adjoining the said locking elements. Resting upon the end face, facing towards the mouth of the hole, of component 38 is one end of a sleeve component 40 having a relatively thin wall. The other end of the said sleeve component bears against the lower end face of an also longitudinal displaceable distance sleeve 42 arranged upon fastening bolt 26. Also arranged between the outer end face of distance sleeve 42 and head 30 of the said fastening bolt is a washer 44 which as will be explained hereinafter in greater detail, not only acts as a flat support between the bolt head and workpiece 10, but also plays a part in the setting of the dowel.

The setting of the dowel, i.e. the anchoring of component 28 in hole 18 is effected by driving conically tapering component 28 axially between the ends of locking elements 36 pointing towards the mouth of the hole. This causes the said locking elements to pivot outwardly and thus to engage in undercut surface 24, i.e. anchoring component 28 and dowel 14 are thus locked positively and cannot be withdrawn from hole 18. Component 38 is driven in, by a blow from the outside, through distance sleeve 42 and sleeve component 40. This means that locking elements 36 must be supported, through head part 34, upon the bottom of hole 18 and distance sleeve 42 must project beyond the surface of workpiece 10 by the distance "a" necessary to allow the said locking element to pivot outwardly, as shown in FIG. 1a.

As shown in dotted lines in this figure, a tubular tool 46 may be placed upon the edge of washer 44 projecting beyond bolt head 30. Light hammer blows upon this tool drives distance sleeve 42 and, through sleeve component 40, conically tapering component 38, axially into hole 18 (FIG. 1b), thus causing locking elements 36 to pivot outwardly into the locking position. Bolt head 30, which is now protruding from washer 44, is then rotated, thus screwing the thread on the lower end of the fastening bolt into head part 34. The said bolt is tightened until bolt head 30 secures workpiece 10, through washer 44, to sub-surface 12 (FIG. 1c).

As a result of discrepancies in the depth of hole 18 and the length of dowel 14, it is conceivable that distance sleeve 42 may still project to some extent beyond the surface of workpiece 10, even after it has been driven in, i.e. washer 44 may still not be seated upon the surface of the said workpiece. If the said workpiece is to be held securely to sub-surface 12, distance sleeve 42 must be driven axially still further into hole 18. This is rendered possible by the fact that the sleeve component, made of a synthetic material, can be deformed axially, as may be gathered from FIGS. 1c and 2b. This means that sleeve components 40 must, on the one hand, posses sufficient resistance to deformation to transfer the hammer blows, during the setting of the dowel, without deformation, to the conically tapering component while, on the other hand, it must be sufficiently deformable to be shortened axially when the fastening bolt is tightened down. This may be achieved by establishing the correct relationship between the thickness of the transition area between locking elements 36 and head part 34, which area is deformed when the said locking elements are provided outwardly, and the thickness of sleeve component 40.

Figure 7:
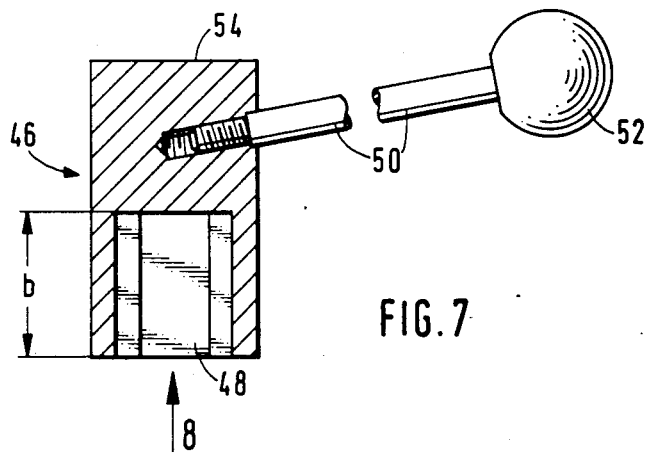
FIG. 7 is a cross-section through a tool designed to set the dowel.
Figure 8:
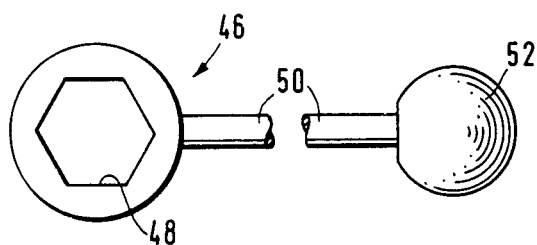
FIG. 8 is a view of the tool from below, as seen in the direction of arrow 8 in FIG. 7.

Instead of being in the form of a piece of tube, as indicated diagrammatically in FIG. 1a, setting tool 46 may be designed as shown in FIGS. 7 and 8, in such a manner that it may be used not only for transferring the hammer blows to washer 44, but also subsequently to rotate bolt head 30. To this end, cavity 48 of the hollow front end of the said tool, which is adapted to be placed loosely over bolt head 30, may be shaped cross-sectionally to fit the said bolt head, i.e. it may be of hexagonal cross-section to fit the said bolt head. In this case, axial length b must, of course, be enough to ensure that, when the dowel is set, by being driven in, bolt head 30 cannot come to rest upon the closed end surface of cavity 48. A lever 50, having an actuating knob at its free end, is screwed laterally into tool 46. This allows the said tool to be rotated in order to tighten down bolt head 30 as soon as component 38 has been driven between the ends of the locking elements by blows upon closed striking surface 54 facing the hollow front end of tool 46.

It will be obvious that both the described example of embodiment of dowel 14, and setting tool 46, may be modified and developed within the scope of the invention. For instance, anchoring component 28 may also be secured against rotation by means of a resilient plastic ring equipped with radially projecting retaining claws and seated snugly in a groove machined into the lower end of head part 34. If a nut is screwed to the outer end of the fastening bolt, in place of bolt head 30 described hereinbefore, the outer end of the said fastening bolt is preferably provided with a screwdriver slot by means of which the bolt can be held while the nut is tightened. This eliminates the need for a device to prevent rotation.

Moreover, deformable, plastic sleeve component 40 may be replaced by a spring, e.g. a helical spring, arranged between conically tapering component 38 and distance sleeve 42, the resistance of the said spring to axial compresssion being such that whereas it can transfer the blows need to pivot locking elements 36 outwardly, it will be compressed resiliently, when subjected to higher forces, instead of being permanently deformed like sleeve component 40.

Tool 46 may also be in the form of an open ended wrench, so that it may be slipped laterally, i.e. in parallel with the surface of the workpiece, over bolt head 30 or the nut, if the latter is provided.

What is claimed is:

1. A fastening arrangement for fastening a workpiece, comprising: a dowel, and a sub-surface; said sub-surface having a cylindrical bore with a mouth at the sub-surface, an end face inside the bore at a distance from the mouth, and an undercut surface between the mouth and the end face and extending radially outwardly from the cylindrical bore; said dowel comprising: an elongated fastening bolt having a first end and a second and spaced from said first end; a bolt head or nut on said second end of said fastening bolt; a distance sleeve arranged around said fastening bolt and having a first end adjacent said bolt head or nut, and a second end remote therefrom; a tubular sleeve having: a circumferential wall with a wedge-shaped peripheral groove, a first end wall, a plurality of slots extending at substantially uniform angular spacing in said circumferential wall from said first end wall to said peripheral groove, thus dividing the tubular sleeve into a plurality of segmental sections, said segmental sections constituting locking elements, the tubular sleeve below said groove forming a head part approximately of the same diameter as the bore, said head part threadedly engaging said first end of said bolt and having a second end wall supported on said end face, the locking elements having ends projecting towards the distance sleeve and being pivotable from a first, radially inward position within the diameter of the bore to a second, locking position in which said locking elements project at least partly radially outwardly beyond the bore for lockingly engaging the undercut surface; a component tapering conically towards and engaging between said ends of said locking elements, and a deformable sleeve arranged around said bolt between said distance sleeve and said component; the resistance of the deformable sleeve to axial deformation being greater than the force required for pivoting the locking elements from the first to the second position; the length of the dowel measured from the second end wall of the tubular sleeve to the first end of the distance sleeve, when the locking elements are in the first, radially inward position, being substantially equal to: the depth of the bore between the mouth and the end face of the bore, plus the thickness of the workpiece to be fastened, plus a length required for pivoting the locking elements from the first position to the second position; whereby first, upon subjecting the distance sleeve to a blow the dowel supported by the second end wall of the head part on the end face of the bore will be compressed such that the locking elements are pivoted from the first position to the second position; and whereby secondly, upon screwing the bolt head or nut further into the head part the deformable sleeve is deformed for fastening the workpiece to the sub-surface.

2. A dowel according to claim 1, comprising a washer between said bolt head or nut and said first end of said distance sleeve and laterally extending beyond said bolt head or nut, for receiving the blow.

3. A set for fastening a workpiece, comprising; a sub-surface, a dowel, and a tool for setting said dowel; said sub-surface having a cylindrical bore with a mouth at the sub-surface, and end face inside the bore at a distance from the mouth, and an undercut surface between the mouth and the end face and extending radially outwardly from the cylindrical bore; said dowel comprising: an elongated fastening bolt having a first end and a second end spaced from said first end; a bolt head or nut on said second end of said fastening bolt, a distance sleeve arranged around said fastening bolt and having a first end adjacent said bolt head or nut, and a second end remote therefrom; a tubular sleeve having: a circumferential wall with a wedge-shaped peripheral groove, a first end wall, a plurality of slots extending at substantialy uniform angular spacing in said circumferential wall from said first end wall to said peripheral groove, thus dividing the tubular sleeve into a plurality of segmental sections, said segmental sections constituting locking elements, the tubular sleeve below said groove forming a head part approximately of the same diameter as the bore, said head part threadedly engaging said first end of said bolt and having a second end wall supported on said face, the locking elements having end projecting towards the distance sleeve and being pivotable from a first, radially inward position within the diameter of the bore to a second, locking position in which said locking elements project at least partly radially outwardly beyond the bore for lockingly engaging the undercut surface; a component tapering conically towards and engaging between said ends of said locking elements, and a deformable sleeve arranged around said bolt between said distance sleeve and said component; the resistance of the deformable sleeve to axial deformation being greater than the force required for pivoting the locking elements from the first to the second position; the length of the dowel measured from the second end wall of the tubular sleeve to the first end of the distance sleeve when the loocking elements are in the first, radially inward position being substantially equal to: the depth of the bore between the mouth and the end face of the bore, plus the thickness of the workpiece to be fastened, plus a length required for pivoting the locking elements from the first position to the second position; a washer between said bolt head or nut and said distance sleeve and laterally extending beyond said bolt head or nut; said tool comprising a front end with a cavity of a depth equaling at least the height of the bolt head or nut, plus the length required for pivoting the locking elements from the first to the second position; and a rear end with a striking surface; whereby upon placement of the front end of the tool on the washer and subjecting the striking surface to a blow the dowel supported by the second end wall of the head part on the end face of the bore, will be compressed such that the locking elements are pivoted from the first position to the second position; and whereby, upon screwing the bolt head or nut further into the heaad part the deformable sleeve is deformed for fastening the workpiece to the sub-surface.

4. A set according to claim 3, wherein said cavity of said tool machines the shape of the bolt head or nut, and said tool has a lever arm for turning said tool.

* * * * *